(12) United States Patent
Sohn

(10) Patent No.: US 7,006,157 B2
(45) Date of Patent: Feb. 28, 2006

(54) APPARATUS AND METHOD FOR CONVERTING FRAME RATE

(75) Inventor: Young-wook Sohn, Seoul (KR)

(73) Assignee: Samsung Electronics Co., Ltd., (KR)

( * ) Notice: Subject to any disclaimer, the term of this patent is extended or adjusted under 35 U.S.C. 154(b) by 529 days.

(21) Appl. No.: 10/367,787

(22) Filed: Feb. 19, 2003

(65) Prior Publication Data

US 2003/0156641 A1   Aug. 21, 2003

(30) Foreign Application Priority Data

Feb. 19, 2002  (KR) .................................. 2002-8753

(51) Int. Cl.
*H04N 5/14*  (2006.01)

(52) U.S. Cl. .................... 348/699; 348/459; 348/416.1

(58) Field of Classification Search ................ 348/441, 348/451, 452, 459, 443, 699, 700, 701, 402.1, 348/416.1; H04N 7/24, 7/01
See application file for complete search history.

(56) References Cited

U.S. PATENT DOCUMENTS

| 5,561,475 | A | * | 10/1996 | Jung .......................... 348/699 |
| 5,596,370 | A | * | 1/1997 | Jung ...................... 375/240.16 |
| 5,818,536 | A | * | 10/1998 | Morris et al. .......... 375/240.15 |
| 5,859,672 | A | * | 1/1999 | Kawahara .................... 348/699 |
| 6,151,075 | A | * | 11/2000 | Shin et al. .................. 348/459 |
| 6,895,361 | B1 | * | 5/2005 | Yang .......................... 702/179 |

FOREIGN PATENT DOCUMENTS

JP         9-130812 A     5/1997

* cited by examiner

*Primary Examiner*—Michael H. Lee
(74) *Attorney, Agent, or Firm*—Sughrue Mion, PLLC

(57) ABSTRACT

Provided are a method and apparatus for performing frame rate conversion. With the apparatus, current video data and previous video data are compared with each other and a motion vector is detected based on the compared result; an error in the detected motion vector is compensated for based on adjacent motion vectors; and one of the detected motion vector and a compensated motion vector is selected as a final motion vector, based on errors in the detected and compensated motion vectors. Accordingly, a more reliable motion vector can be selected to perform frame rate conversion, thereby more naturally depicting an image.

15 Claims, 10 Drawing Sheets

FIG. 3
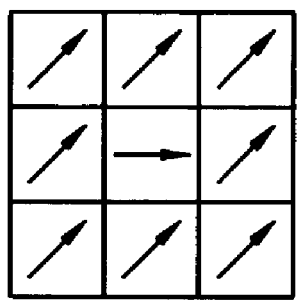
MOTION VECTOR
BLOCK
(a)
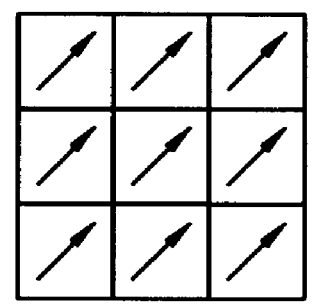
COMPENSATED MOTION
VECTOR BLOCK
(b)

FIG. 9
(a)
(b)

FIG. 10
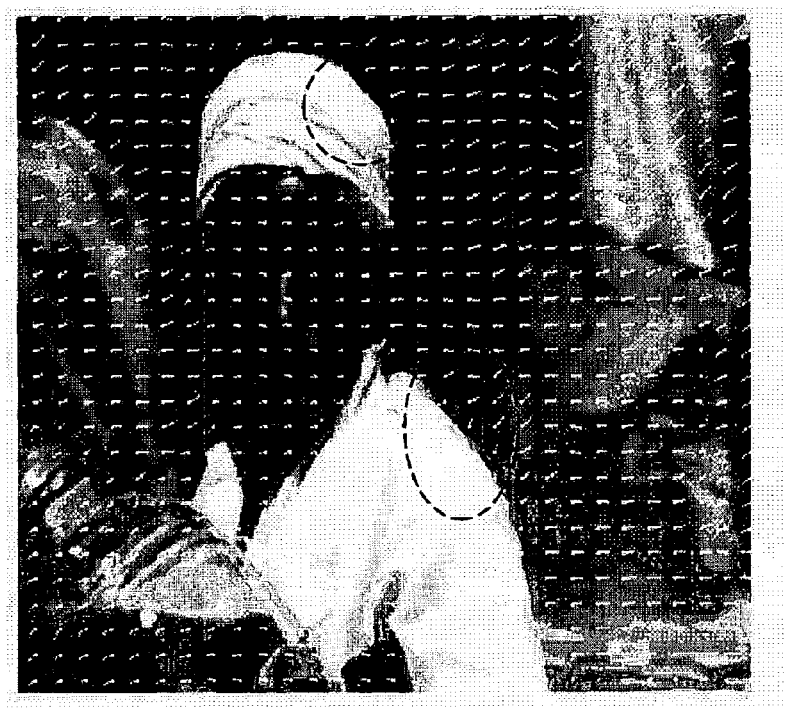
(a)
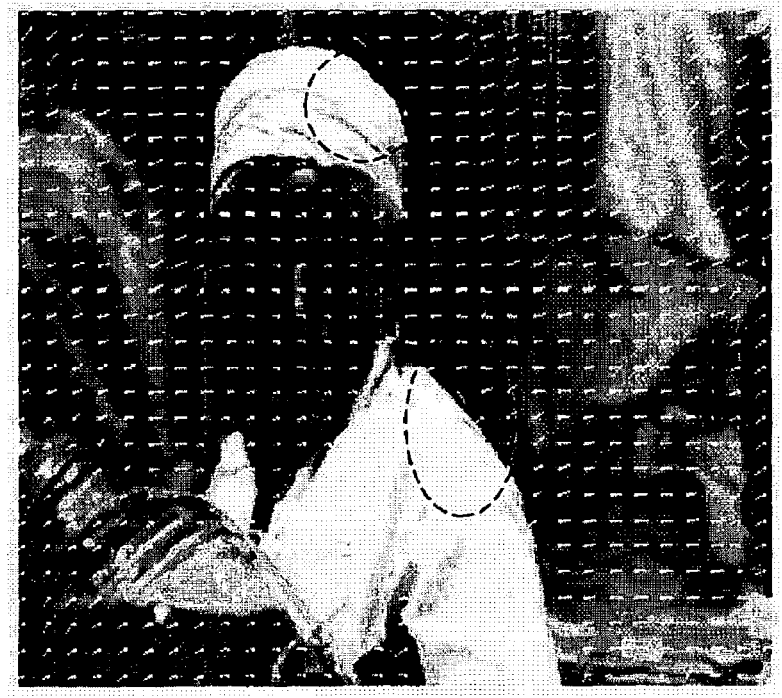
(b)

APPARATUS AND METHOD FOR CONVERTING FRAME RATE

BACKGROUND OF THE INVENTION

This application claims the priority of Korean Patent Application No. 2002-8753 filed on Feb. 19, 2002, in the Korean Intellectual Property Office, the disclosure of which is incorporated herein in its entirety by reference.

1. Field of the Invention

The present invention relates to an apparatus and method for converting a frame rate, and more particularly, to an apparatus and method for converting a frame rate using operational vectors.

2. Description of the Related Art

A frame is a unit of a video image that consists of pixels, and thus, resolution of a video image depends on the number of pixels of a frame. For instance, a frame having a maximum resolution of 1920×1080 consists of 1920 pixels in the horizontal direction and 1080 pixels in the vertical direction. A frame rate refers to the number of frames that are transmitted per second. In order to transmit a video signal such as a television signal, an appropriate number of frames are transmitted in the units of seconds, based on visual characteristics of a human being.

In general, a video signal output from a video outputting apparatus is converted into a signal having a frequency that is permitted by a region to which the video signal is to be transmitted. For instance, the frequency of a video signal which is to be transmitted to Europe and China is converted into a vertical frequency of 50 Hz, and the frequency of a video signal which is to be transmitted to South Korea and North America is converted into a vertical frequency of 60 Hz. Therefore, frequency conversion is needed in order to enable one video outputting apparatus to output video signals of different frequencies. The frequency conversion is called frame rate conversion. In particular, the number of frames must be increased to convert a low frequency signal into a high frequency signal. In general, according to the frame rate conversion, the number of frames is increased by overlapping adjacent frames or by generating new frames using a detected motion vector based on a difference between adjacent frames.

Also, a more natural image is depicted by compensating a motion vector in a system requiring high resolution, so that the motion of a current image is changed according to the motion of the entire image. A motion vector is compensated by extracting a block of a predetermined size, which has a plurality of motion vectors including the motion vector which is to be compensated, and correcting a motion vector, which moves in a different direction from adjacent motion vectors, to move in the same direction as the adjacent motion vectors.

However, such a method of compensating a motion vector generates a compensation value based on the statistical distribution of adjacent motion vectors, and thus, there is a probability that the motion vector may be mistakenly compensated if the adjacent motion vectors contain errors. Further, if an actual image contains a portion that moves in the different direction from other portions, compensation for the portion may be performed without reflecting a change in the actual image even if a motion vector for the portion is detected.

SUMMARY OF THE INVENTION

The present invention provides an apparatus and method for more effectively performing frame rate conversion.

The present invention also provides an apparatus and method for performing frame rate conversion by more reliably detecting a motion vector even if adjacent motion vectors contain errors.

The present invention also provides an apparatus and method for performing frame rate conversion, in which a motion vector for a portion of an image, which moves in the different direction from other portions, is detected and an error in the image is compensated for while a change in the image is reflected during the compensation.

According to an aspect of the present invention, there is provided a frame rate conversion apparatus including a motion vector detecting unit comparing previous and current video data and detecting a motion vector based on the compared result; a motion vector compensating unit compensating for an error in the detected motion vector based on adjacent motion vectors; and a motion vector selecting unit selecting one of the detected motion vector and the compensated motion vector based on the errors in the detected and compensated motion vectors.

According to another aspect of the present invention, there is provided a frame rate conversion method including comparing current and previous video data and detecting a motion vector based on the compared result; compensating for an error in the detected motion vector based on adjacent motion vectors; and selecting one of the detected motion vector and a compensated motion vector as a final motion vector, based on errors in the detected and compensated motion vectors.

BRIEF DESCRIPTION OF THE DRAWINGS

The above and other aspects and advantages of the present invention will become more apparent by describing in detail preferred embodiments thereof with reference to the attached drawings in which:

FIG. 3 shows examples of (a) an extracted motion vector block to be compensated, and (b) the motion vector block corrected using a frame rate conversion apparatus as shown in FIG. 1, according to an embodiment of the present invention;

FIG. 9 shows images obtained through conventional frame rate conversion and frame rate conversion according to an embodiment of the preset invention; and FIG. 10 illustrates the images shown in FIGS. 9(a) and 9(b) in which the motion vectors are indicated.

DETAILED DESCRIPTION OF THE INVENTION

Figure 1:
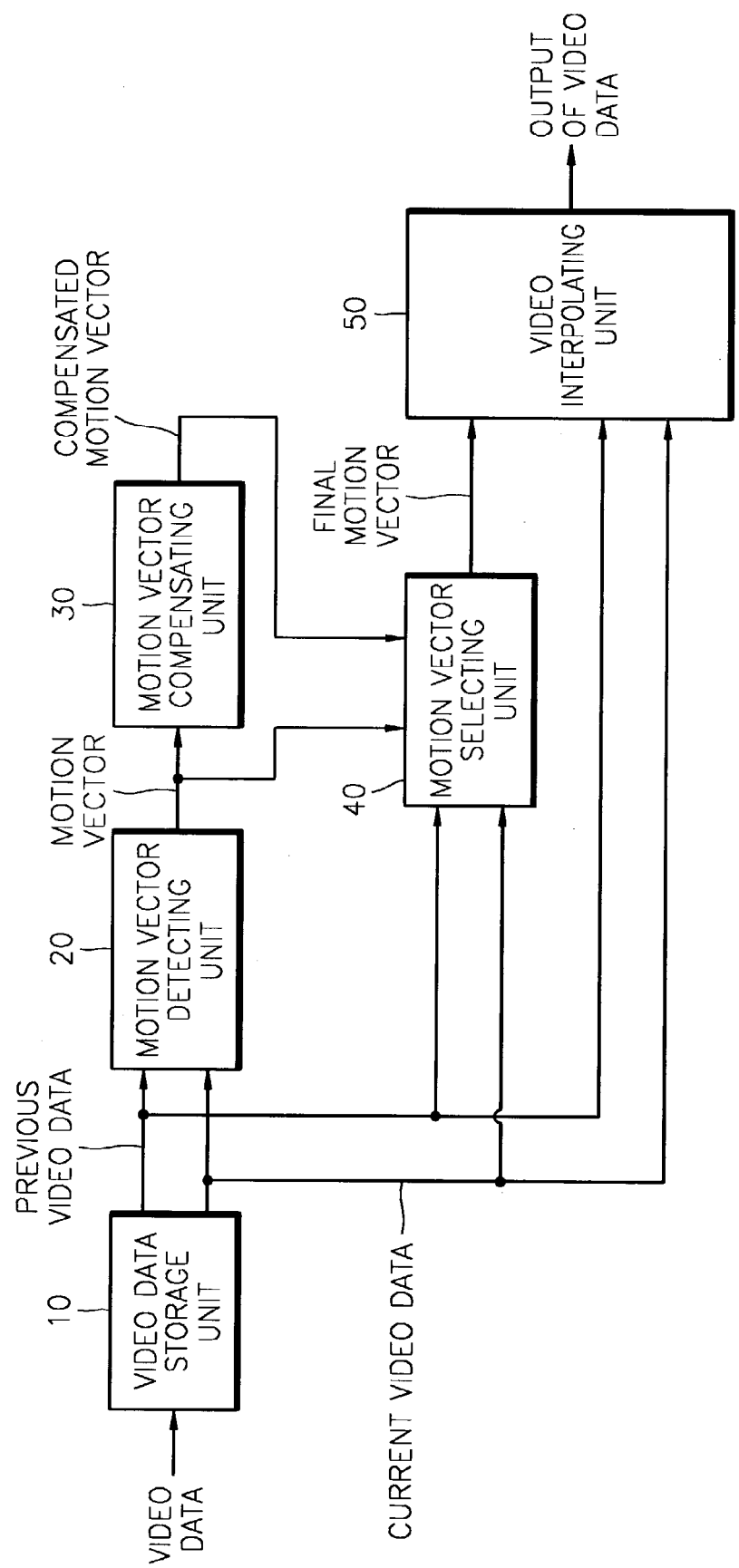
FIG. 1 is a block diagram of a frame rate conversion apparatus according to an embodiment of the present invention.

FIG. 1 is a block diagram of a frame rate conversion apparatus according to an embodiment of the present invention. The frame rate conversion apparatus of FIG. 1 includes a video data storage unit 10, a motion vector detecting unit 20, a motion vector compensating unit 30, a motion vector selecting unit 40, and a video interpolation unit 50.

The operations of a frame rate conversion apparatus will now be explained in detail with reference to FIG. 1. First, input video data is divided into previous video data and current video data and stored in units of frames in the video data storage unit 10. The motion vector detecting unit 20 compares the previous video data and the current data stored in the video data storage unit 10 and detects a motion vector of each of the pixels, which depict an image, based on a difference between previous and current video data. The motion vector compensating unit 30 compensates for an error in the detected motion vector and outputs the compensated motion vector. The motion vector selecting unit 40 calculates error values in the detected motion vector and the compensated motion vector, selects the motion vector having a smaller error value out of the calculated error values as a final motion vector, and outputs the selected motion vector. The video interpolating unit 50 receives video data from the video data storage unit 10 and the final motion vector from the motion vector selecting unit 40, combines them to form an image, and outputs the image.

Figure 2:
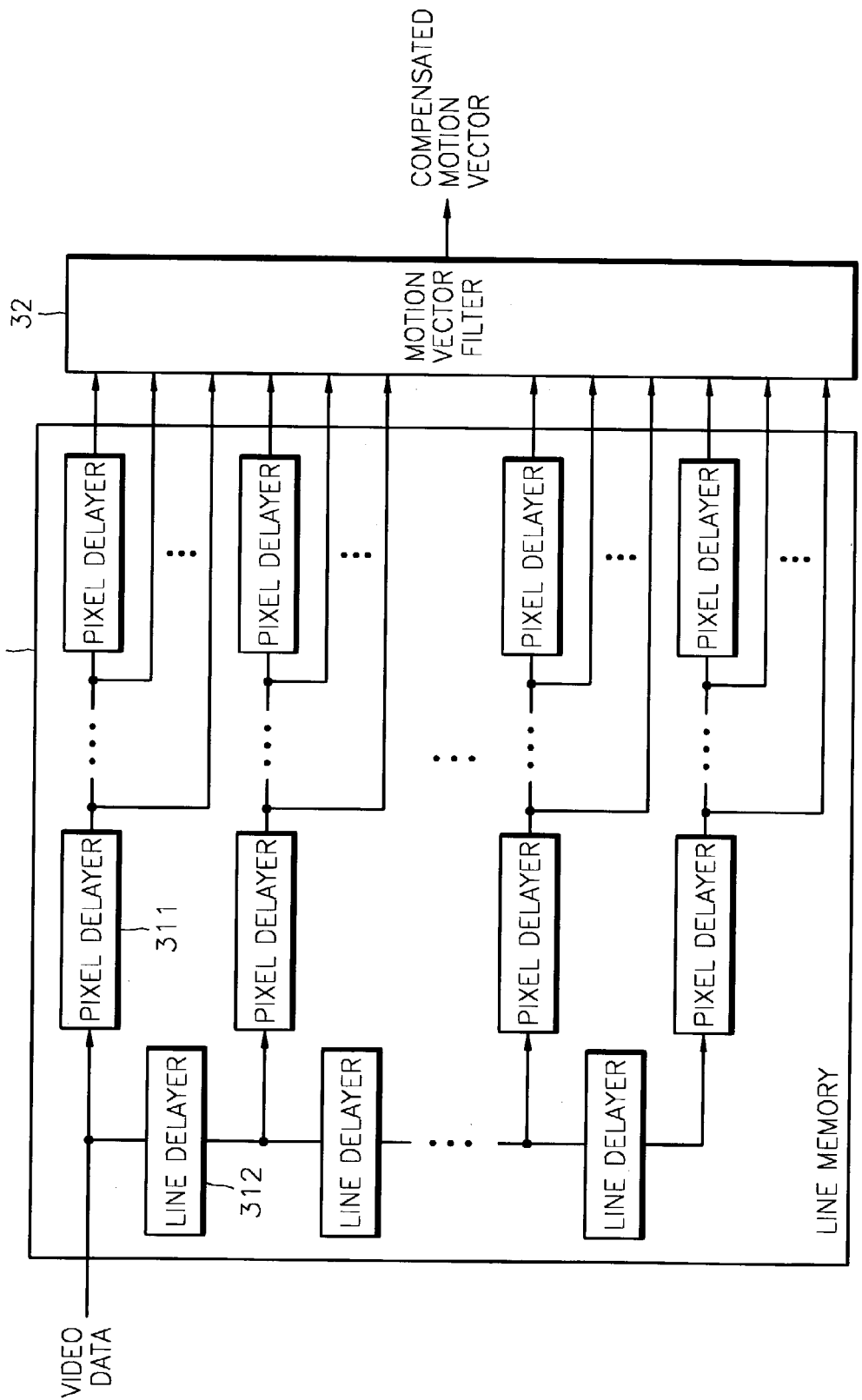
FIG. 2 is a block diagram of the structure of a motion vector compensating unit of FIG. 1.

FIG. 2 is a block diagram illustrating the structure of the motion vector compensating unit 30 of FIG. 1, according to an embodiment of the present invention. The motion vector compensating unit 30 includes a line memory unit 31 and a motion vector filter 32.

Hereinafter, the operations of the motion vector compensating unit 30 will be explained with reference to FIGS. 1 and 2.

First, the line memory unit 31 stores a motion vector detected by the motion vector detecting unit 20. The line memory unit 31 includes pixel delayers 311 and line delayers 312 corresponding to the resolution of an image. For instance, the line memory unit 31 having 1920 pixel delayers 311 and 1080 line delayers 312 is required to support a digital television (DTV) having a maximum resolution of 1920×1080. Each pixel delayer 311 stores and delays a motion vector for each of the pixels contained in a frame in the horizontal direction, and each line delayer 312 stores and delays a motion vector for each of the pixels in the vertical direction.

Next, the motion vector filter 32 extracts a plurality of motion vectors including a motion vector which needs to be corrected from the line memory unit 31 in units of blocks of predetermined sizes. Then, the motion vector filter 32 corrects a motion vector at a central point of each of the extracted blocks to move in the same direction as adjacent motion vectors. If the adjacent motion vectors move in different directions, one of a mean value, an average value, and a weight is calculated based on the mean value, average value, and the weight of the adjacent motion vectors, the motion vector is corrected based on the calculated value, and the compensated motion vector is output.

FIG. 3 shows examples of illustrating (a) an extracted motion vector block to be compensated for, and (b) the compensated motion vector block, according to an embodiment of the present invention. If an extracted block is k wide and l long, its size can be indicated as k×l. The blocks shown in FIG. 3 are 3×3 blocks illustrating extracting and correcting a motion vector. Referring to FIG. 3(a), a motion vector at a center of the extracted block moves in the different direction from adjacent motion vectors, and referring to FIG. 3(a), the motion vector is compensated to move in the same direction as the adjacent motion vectors.

Figure 4:
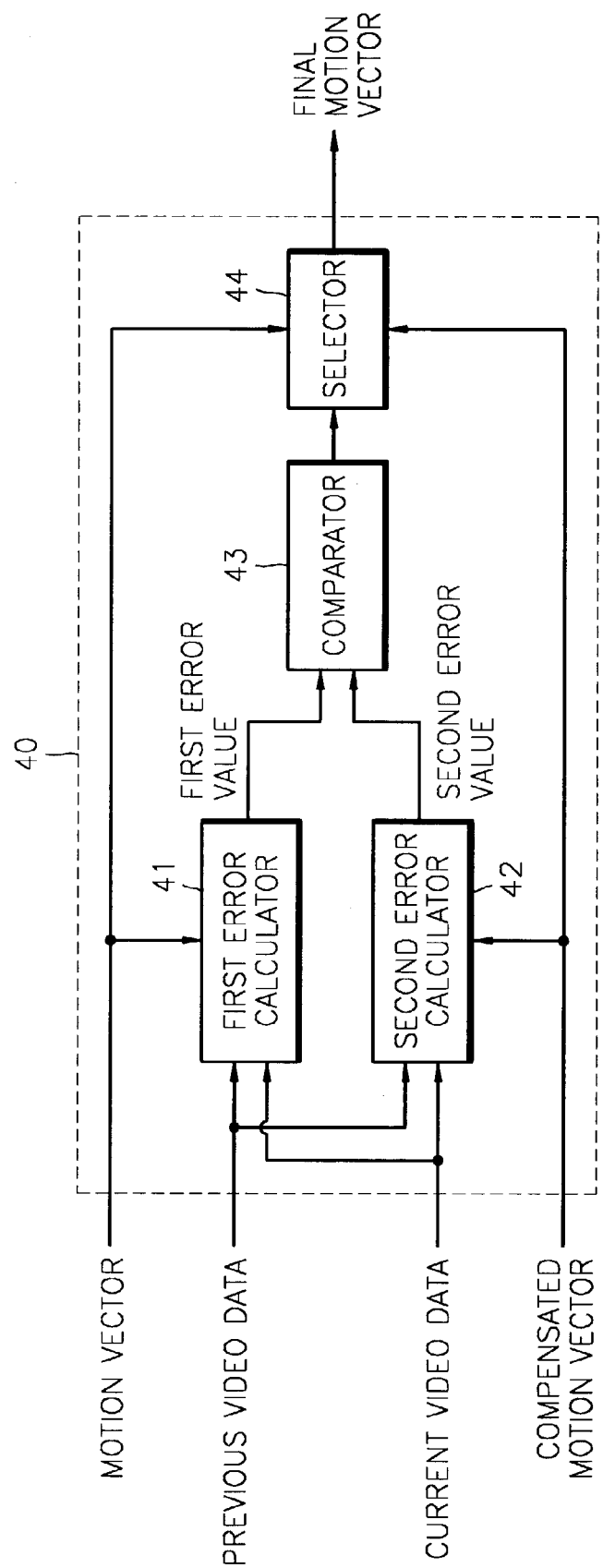
FIG. 4 is a block diagram of the structure of a motion vector selecting unit of FIG. 1.

FIG. 4 is a block diagram illustrating the structure of the motion vector selecting unit 40 according to an embodiment of the present invention. The motion vector selecting unit 40 includes a first error calculator 41, a second error calculator 42, a comparator 43, and a selector 44.

Hereinafter, the operations of the motion vector selecting unit 40 will be described with reference to FIG. 4. First, the first error calculator 41 receives previous and current video data from the video data storage unit 10, receives a motion vector detected by the motion vector detecting unit 20, calculates absolute errors of the previous and current motion vectors based on the positions of the moved previous and current motion vectors, and combines the absolute errors to obtain a first error value. The second error calculator 42 receives the previous and current video data from the video data storage unit 10, receives a motion vector compensated by the motion vector compensating unit 30, calculates absolute errors of the previous and current motion vectors based on the positions of the moved previous and current motion vectors, and combines the absolute errors to obtain a second error value. The comparator 43 compares the first error value with the second error value, and outputs a control signal for selecting one of the detected motion vector and the compensated motion vector based on the compared result.

Figure 5:
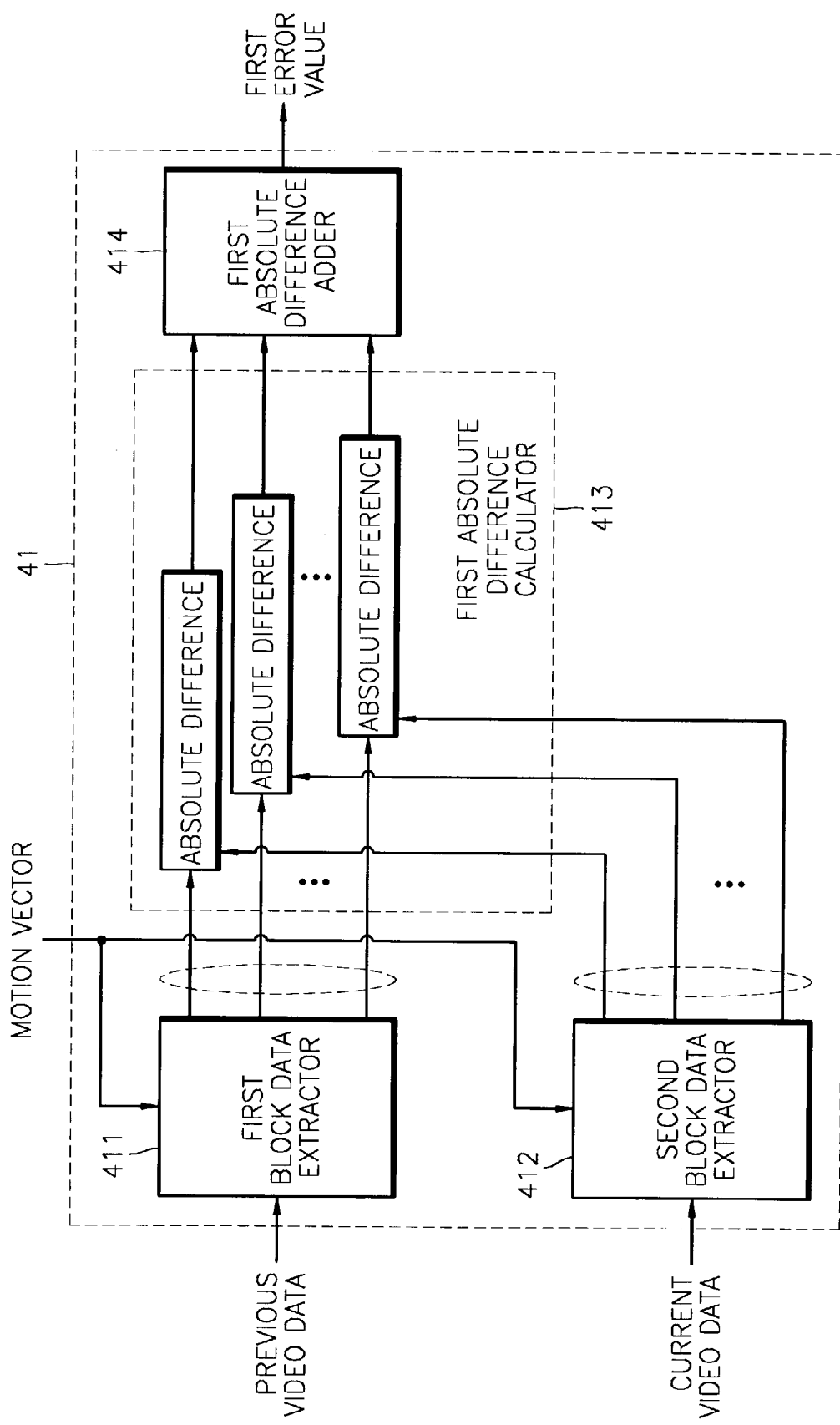
FIG. 5 is a block diagram of the structure of a first error calculating unit of FIG. 1.

FIG. 5 is a block diagram illustrating the structure of the first error calculator 41 according to an embodiment of the present invention. The first error calculator 41 includes a first block data extractor 411, a second block data extractor 412, a first absolute difference calculator 413, and a first absolute difference adder 414.

Referring to FIG. 5, the operations of the first error calculator 41 will now be explained in greater detail. The first block data extractor 411 receives the previous video data from the video data storage unit 10, extracts first block data from the previous data in units of predetermined sized blocks, and outputs the first block data as pixel data to the first absolute difference calculator 413. A total number of the pixel data corresponds to the size of a unit block. For instance, if the unit block is m wide and n long, m×n pixel data is output to the first absolute difference calculator 413. The second block data extractor 412 receives the current video data from the video data storage unit 10, extracts second block data, in units of predetermined sized blocks, at a predetermined position, and outputs the second block data as pixel data to the first absolute difference calculator 413. The predetermined position is obtained by moving the position of a block, which is extracted by the first block data extractor 411, by the position of a detected motion vector. A total number of the pixel corresponds to the size of the unit block. The first absolute difference calculator 413 consists of absolute difference comparators, a total number of these comparators corresponding to the size of the unit block. Each absolute comparator calculates an absolute difference between the positions of the pixel data in the first block data extractor 411 and the pixel data in the second block data extractor 412, and outputs obtained absolute difference value to the first absolute difference adder 414. Then, the first absolute difference adder 414 adds received absolute difference values to obtain a first error value, and outputs the obtained first error value, the total number of the absolute difference values corresponding to the size of the unit block.

Figure 6:
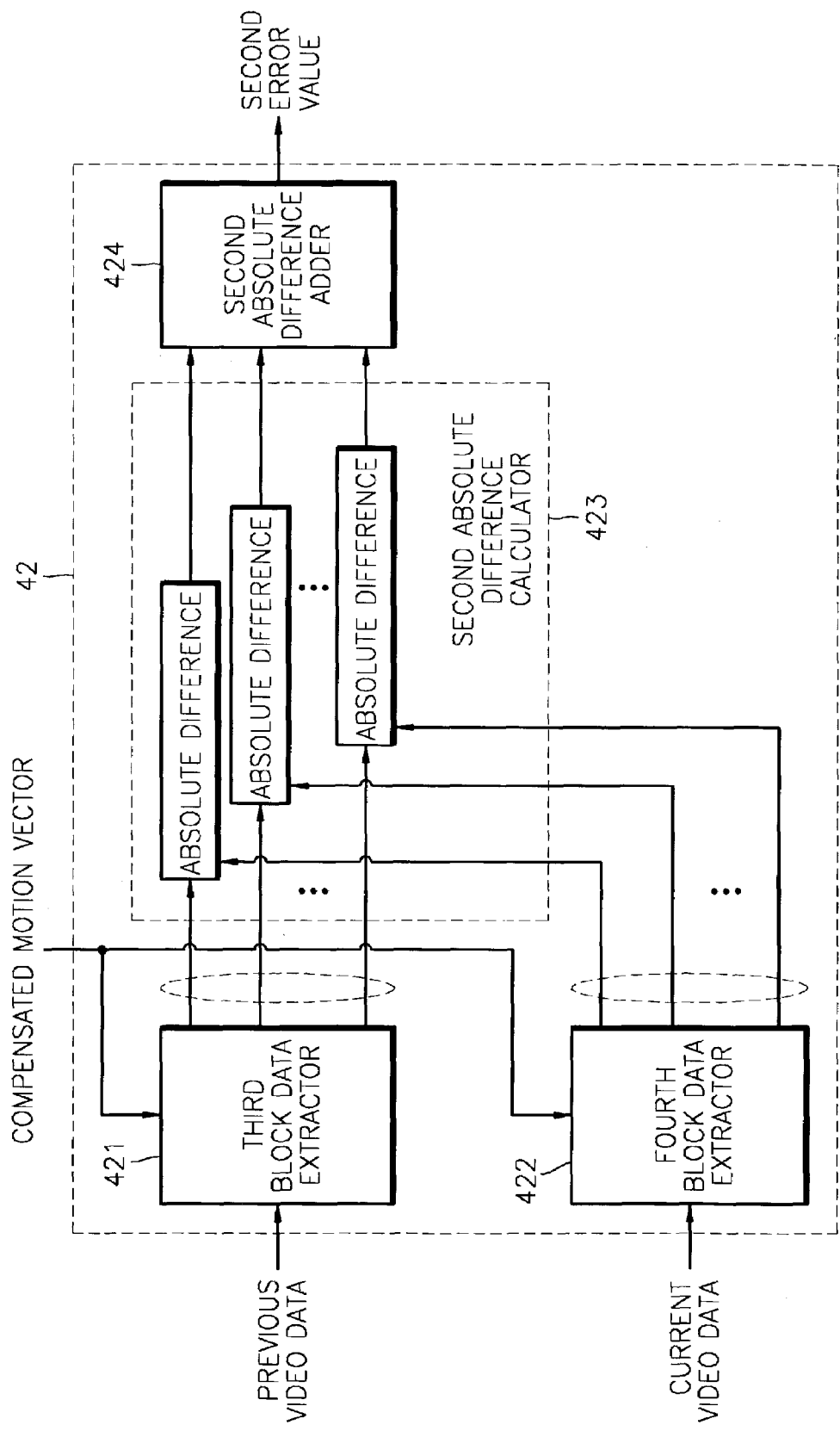
FIG. 6 is a block diagram of the structure of a second error calculating unit of FIG. 1.

FIG. 6 is a block diagram illustrating the structure of the second error calculator 42 according to an embodiment of the present invention. The second error calculator 42 includes a third block data extractor 421, a fourth block data extractor 422, a second absolute difference calculator 423, and a second absolute difference adder 424.

Referring to FIG. 6, the operations of the second error calculator 42 will now be described in greater detail. First, the third block data extractor 421 receives the previous video data from the video data storage unit 10, extracts third block data from the previous data in units of predetermined sized blocks, and outputs the third block data as pixel data to the second absolute difference calculator 423. A total number of the pixel data corresponds to the size of the unit block. The fourth block data extractor 422 receives the current video data from the video data storage unit 10, extracts fourth block data, in units of predetermined sized blocks, at a predetermined position, and outputs the fourth block data as pixel data to the second absolute difference calculator 423. The predetermined position is obtained by moving the position of a block, which is extracted by the fourth block data extractor 421, by the position of a detected motion vector. The second absolute calculator 423 consists of absolute difference comparators, a total number of these comparators corresponding to the size of the unit block. Each absolute difference comparator calculates an absolute difference between the positions of the pixel data in the third block data extractor 421 and the pixel data in the fourth block data extractor 422, and outputs an obtained absolute difference value to the second absolute difference adder 424. Then, the second absolute difference adder 424 adds received absolute difference values to obtain a second error value, and outputs the obtained second error value.

Figure 7:
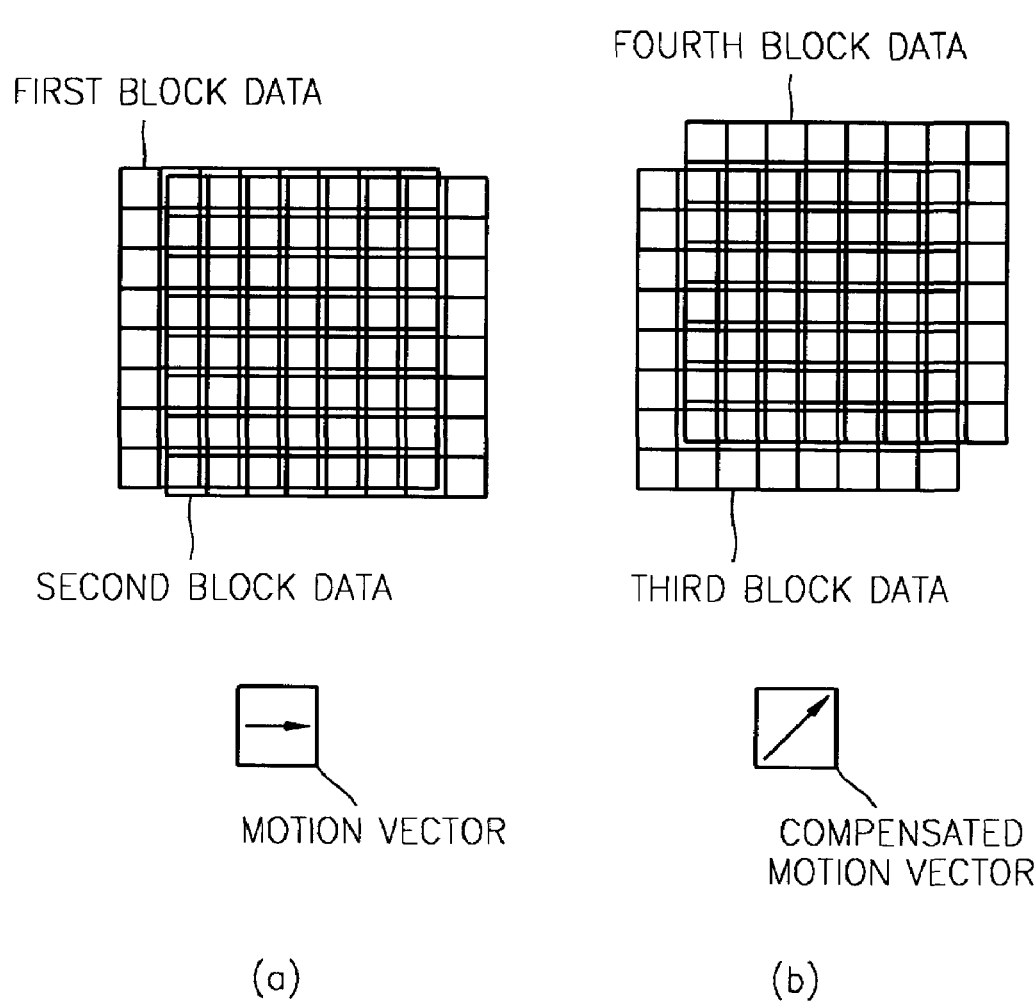
FIG. 7 shows examples of block data for determining positions at which block data is extracted, using the first and second error calculators.

FIG. 7 illustrates examples of block data for determining positions at which block data is extracted, using the first and second error calculators 41 and 42 according to an embodiment of the present invention. Referring to FIG. 7, extracting of block data used in calculating error values will now be described in greater detail. The data blocks of FIG. 7 are 8×8 blocks consisting of 64 pixel data.

More specifically, FIG. 7(a) is a diagram illustrating a method of determining a position at which block data is extracted using the first and second block data extractors 411 and 412 included in the first error calculator 41. First block data is extracted at a predetermined position of previous video data in units of blocks, and the position of a detected motion vector is considered in determining a position where second block data, corresponding to the first block data, is extracted from current video data. Referring to FIG. 7(a), the position of the first block data is moved by one pixel in the right direction, and the second block data is extracted from the current video data at the moved position of the first block data, when a motion vector moves in the right direction.

FIG. 7(b) is a diagram illustrating a method of determining a position at which block data is extracted using the third and fourth block data extractors 421 and 422 included in the second error calculator 42. Third block data is extracted at a predetermined position of the previous video data in units of blocks, and the position of a detected motion vector is considered to determine a position where fourth block data, corresponding to the third block data, is extracted from the current video data. In conclusion, the first block data and the third block data are extracted at the same position. Each block data consists of 64 pixel data, and therefore, the first through fourth block data extractors 411, 412, 421, and 422, shown in FIGS. 5 and 6, output 64 pixel data, respectively.

The video interpolation unit 50 performs video interpolation on a final motion vector output from the motion vector selecting unit 40 and video data output from the video data storage unit 10, and as a result, a new image is added to obtain a more natural visual image.

Figure 8:
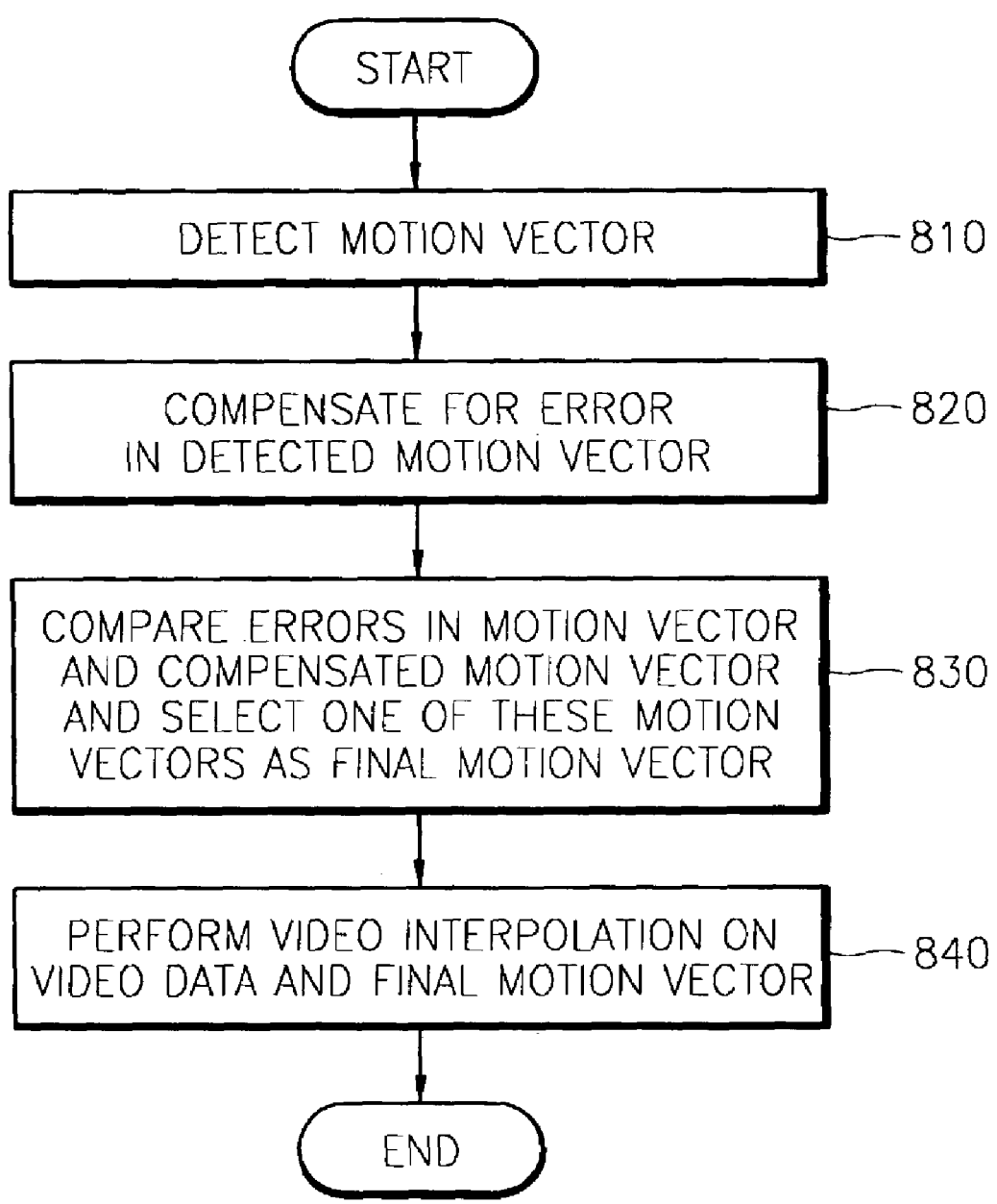
FIG. 8 is a flowchart illustrating a method of performing frame rate conversion according to an embodiment of the present invention.

FIG. 8 is a flowchart illustrating a frame rate conversion method according to an embodiment of the present invention. In the method of FIG. 8, first, video data is stored in units of frames in the video data storage unit 10 (not shown). Then, the motion vector detecting unit 20 compares previous and current video data stored in the video data storage unit 10, and detects a motion vector based on a difference between the previous and current video data, in step 810. Next, the motion vector compensating unit 30 stores the motion vector detected by the motion vector detecting unit 20 in the line memory unit 31, extracts a motion vector, which is to be compensated, in a unit of a predetermined sized block, and an error in the extracted motion vector is compensated for based on adjacent motion vectors, in step 820. After step 820, a difference between errors in the detected and compensated motion vectors is compared to select a final motion vector in step 830. More specifically, in step 830, the first error calculator 41 of the motion vector selecting unit 40 extracts first block data, in units of predetermined sized blocks, at a predetermined position of the previous video data in the video data storage unit 10; extracts second block data at a position where the position of the first block data is moved by the position of a detected motion vector; calculates absolute differences between the first and second block data; and adds the calculated absolute differences together to obtain a first error value. Likewise, the second error calculator 42 of the motion vector selecting unit 40 extracts third bock data in units of predetermined sized blocks from the previous video data at the same position as the position where the position of the first block data is extracted; extracts fourth block data at a position where the position of the third block data is moved by the position of the compensated motion vector; calculates absolute differences between the third and fourth block data; and adds the calculated absolute differences together to obtain a second error value. Next, the comparator 43 of the motion vector selecting unit 40 compares the first and second error values and selects one of the detected motion vector and the compensated motion vector based on the compared result, using the selector 44 of the motion vector selecting unit 40. After step 830, the video interpolation unit 50 performs video interpolation on the video data in the video data storage unit 10 and the final motion vector selected in step 830, in step 840.

FIG. 9 illustrates images obtained through frame rate conversion using motion vectors. In detail, FIG. 9(a) is an image obtained through conventional frame rate conversion, and FIG. 9(b) is an image obtained through frame rate conversion according to the present invention. Referring to FIG. 9(a), motion vectors for a turban and shoulder of a figure are inappropriately compensated, thereby causing the unnatural image of FIG. 9(a). In contrast, referring to FIG. 9(b), motion vectors for the turban and shoulder of the figure shown in FIG. 9(a) are compensated, thereby forming a more natural image.

FIG. 10 shows the images of FIGS. 9(a) and 9(b) in which the motion vectors are indicated. In detail, the motion vectors obtained through the conventional frame rate conversion are illustrated in FIG. 10(a), and the motion vectors obtained through the frame rate conversion according to the present invention are illustrated in FIG. 10(b). Referring to FIGS. 10(a) and (b), motion vectors for the unnatural portions of the figure shown in FIG. 9(a) are differently indicated.

While the present invention has been particularly shown and described with reference to preferred embodiments thereof, it will be understood by those of ordinary skill in the art that various changes in form and details may be made therein without departing from the spirit and scope of the present invention as defined by the appended claims.

As described above, a method and apparatus for converting frame rates are advantageous in that (i) it is possible to prevent a target motion vector, which is detected in a current image block, from being mistakenly corrected based on adjacent improper motion vectors; and (ii) it is possible to obtain a more precise and natural image by comparing error values in a detected motion vector and a compensated motion vector, selecting a motion vector having a smaller error value as a final motion vector, and performing video interpolation on the desired image and the selected motion vector.

What is claimed is:

1. A frame rate conversion apparatus comprising:
  a motion vector detecting unit comparing previous and current video data and detecting a motion vector based on the compared result;
  a motion vector compensating unit compensating for an error in the detected motion vector based on adjacent motion vectors and generating a compensated motion vector; and
  a motion vector selecting unit selecting one of the detected motion vector and the compensated motion vector based on the error in the detected motion vector and an error in the compensated motion vector.

2. The apparatus of claim 1, wherein the motion vector selecting unit comprises:
  a first error calculator calculating a first error value based on absolute differences between the previous video data and the current video data, the current video data being obtained in consideration of the detected motion vector;
  a second error calculator calculating a second error value based on absolute differences between the previous video data and the current video data, the current video data being obtained in consideration of the compensated motion vector; and
  a motion vector selector comparing the first and second error values, and selecting one of the detected and compensated motion vectors as the final motion vector, based on the comparing of the first and second error values.

3. The apparatus of claim 2, wherein the first error calculator comprises:
  a first block data extractor extracting first block data in units of blocks from the current video data;
  a second block data extractor extracting second block data in units of blocks from the previous video data at a predetermined position, the predetermined position obtained by moving a position of the first block data by a position of the detected motion vector;
  a first absolute difference calculator calculating absolute differences between the first and second block data; and
  a first absolute difference adder adding the absolute differences calculated by the first absolute difference calculator.

4. The apparatus of claim 2, wherein the second error calculator comprises:
  a third block data extractor extracting third block data from the current video data in units of blocks;
  a fourth block data extractor extracting fourth block data from the previous video data at a predetermined position, the predetermined position obtained by moving a position of the third block data by the compensated motion vector;
  a second absolute difference calculator calculating absolute differences between the third and fourth block data; and
  a second absolute difference adder adding the absolute differences calculated by the second absolute difference calculator.

5. The apparatus of claim 1, wherein the motion vector detecting unit detects a plurality of motion vectors, and wherein the motion vector compensating unit comprises:
  a memory unit holding detected motion vectors in units of lines; and
  a motion vector filter extracting motion vectors, which are to be compensated, from the memory unit in units of blocks, and compensating errors in the extracted motion vectors based on adjacent motion vectors.

6. A frame rate conversion method comprising:
  comparing current and previous video data and detecting a motion vector based on the compared result;
  compensating an error in the detected motion vector based on adjacent motion vectors; and
  selecting one of the detected motion vector and a compensated motion vector as a final motion vector, based on errors in the detected and compensated motion vectors.

7. The method of claim 6, wherein selecting one of the detected and compensated motion vectors comprises:
  calculating a first error value using absolute error values of the previous video data and the current video data, the current video data being obtained in consideration of the detected motion vector;
  calculating a second error using absolute error values of the previous video data and the current video data, the current video data being obtained in consideration of the compensated motion vector; and
  selecting one of the detected and compensated motion vectors as the final motion vector, based on a result of comparing the first and second error values.

8. The method of claim 7, wherein calculating the first error value comprises:
  extracting first block data from the previous video data in units of blocks;
  extracting second block data from the current video data at a changed position of the first block data moved in accordance with the detected motion vector, the second block data corresponding to the first block data;
  calculating absolute differences between the first and second block data; and
  adding the calculated absolute values together.

9. The method of claim 7, wherein calculating the second error value comprises:
  extracting third block data from the previous video data in units of blocks;
  extracting fourth block data from the current video data in units of blocks at a changed position of the third block data moved in accordance with the compensated motion vector, the fourth block data corresponding to the third block data;
  calculating absolute differences between the third and fourth block data; and
  adding the calculated absolute differences together.

10. The method of claim 6, wherein compensating an error in the motion vector comprises:

storing the detected motion vector in a memory unit in units of lines;

extracting a motion vector, which is to be compensated, from the memory unit in units of blocks; and filtering the motion vector by compensating an error in the motion vector based on adjacent motion vectors.

11. A computer-readable recording medium for recording a computer program code for enabling a computer to provide a service of frame rate conversion, the service comprising steps of:

comparing current and previous video data and detecting a motion vector based on the compared result;

compensating an error in the detected motion vector based on adjacent motion vectors; and selecting one of the detected motion vector and a compensated motion vector as a final motion vector, based on errors in the detected and compensated motion vectors.

12. The computer-readable recording medium of claim 11, wherein selecting one of the detected and compensated motion vectors comprises:

calculating a first error value using absolute error values of the previous video data and the current video data, the current video data being obtained in consideration of the detected motion vector;

calculating a second error using absolute error values of the previous video data and the current video data, the current video data being obtained in consideration of the compensated motion vector; and selecting one of the detected and compensated motion vectors as the final motion vector, based on a result of comparing the first and second error values.

13. The computer-readable recording medium of claim 12, wherein calculating the first error value comprises:

extracting first block data from the previous video data in units of blocks;

extracting second block data from the current video data at a changed position of the first block data moved in accordance with the detected motion vector, the second block data corresponding to the first block data;

calculating absolute differences between the first and second block data; and adding the calculated absolute values together.

14. The computer-readable recording medium of claim 12, wherein calculating the second error value comprises:

extracting third block data from the previous video data in units of blocks;

extracting fourth block data from the current video data in units of blocks at a changed position of the third block data moved in accordance with the compensated motion vector, the fourth block data corresponding to the third block data;

calculating absolute differences between the third and fourth block data; and adding the calculated absolute differences together.

15. The computer-readable recording medium of claim 11, wherein compensating an error in the motion vector comprises:

storing the detected motion vector in a memory unit in units of lines;

extracting a motion vector, which is to be compensated, from the memory unit in units of blocks; and filtering the motion vector by compensating an error in the motion vector based on adjacent motion vectors.

* * * * *